US008706588B1

(12) United States Patent
Zhu

(10) Patent No.: US 8,706,588 B1
(45) Date of Patent: Apr. 22, 2014

(54) SYSTEM AND METHOD OF PROVISIONING CONFIDENTIAL INFORMATION VIA A MOBILE DEVICE

(75) Inventor: Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 482 days.

(21) Appl. No.: 12/254,267

(22) Filed: Oct. 20, 2008

(51) Int. Cl.
*G06Q 40/00* (2012.01)

(52) U.S. Cl.
USPC .............................. 705/35; 705/38

(58) Field of Classification Search
CPC .................................. G06Q 40/00
USPC ........................................ 705/35
See application file for complete search history.

(56) References Cited

U.S. PATENT DOCUMENTS

| | | | |
|---|---|---|---|
| 5,276,311 A | 1/1994 | Hennige |
| 5,310,999 A | 5/1994 | Claus et al. |
| 5,453,601 A | 9/1995 | Rosen |
| 5,530,702 A | 6/1996 | Palmer et al. |
| 5,590,038 A | 12/1996 | Pitroda |
| 6,000,608 A | 12/1999 | Dorf |
| 6,012,634 A | 1/2000 | Brogan et al. |
| 6,122,625 A | 9/2000 | Rosen |
| 6,199,161 B1 | 3/2001 | Ahvenainen |
| 6,290,127 B1 | 9/2001 | Schilling |
| 6,360,954 B1 | 3/2002 | Barnardo |
| 6,405,181 B2 | 6/2002 | Lent et al. |
| 6,466,777 B1 | 10/2002 | Urita |
| 6,584,326 B1 | 6/2003 | Boydston et al. |
| 6,591,098 B1 | 7/2003 | Shieh et al. |
| 6,631,849 B2 | 10/2003 | Blossom |
| 6,679,423 B2 | 1/2004 | Ijichi et al. |
| 6,705,521 B1 | 3/2004 | Wu et al. |
| 6,755,342 B1 | 6/2004 | Jordan, Jr. |
| 6,817,521 B1 | 11/2004 | Matada |
| 6,879,965 B2 | 4/2005 | Fung et al. |
| 6,938,821 B2 | 9/2005 | Gangi |
| 7,146,159 B1 | 12/2006 | Zhu |
| 7,233,785 B2 | 6/2007 | Yamagishi et al. |
| 7,269,256 B2 | 9/2007 | Rosen |

(Continued)

FOREIGN PATENT DOCUMENTS

WO WO2004105421 A2 12/2004

OTHER PUBLICATIONS

Katzer, Robin Dale, et al., Patent application entitled "System and Method of Over-the-Air Provisioning," filed Feb. 5, 2008 as U.S. Appl. No. 12/026,224.

(Continued)

*Primary Examiner* — Bruce I Ebersman
*Assistant Examiner* — John Anderson

(57) ABSTRACT

A method of provisioning confidential information to a target device is provided. The method comprises a mobile device wirelessly transmitting using a public land mobile network a message to request confidential information, wherein the confidential information is associated with at least one of a credit card, a transit card, a transit token, an electronic coupon, a loyalty program access code, an access badge, and an access code. The method also comprises the mobile device wirelessly receiving the confidential information from the public land mobile network and transmitting the confidential information using near field communication technology to the target device. The method also comprises the target device receiving the confidential information using near field communication technology and storing the confidential information.

20 Claims, 6 Drawing Sheets

(56) References Cited

U.S. PATENT DOCUMENTS

| | | |
|---|---|---|
| 7,413,113 B1 | 8/2008 | Zhu |
| 7,434,723 B1 | 10/2008 | White et al. |
| 7,475,044 B1 | 1/2009 | Kawai et al. |
| 7,494,067 B1 | 2/2009 | Zhu |
| 7,546,956 B2 | 6/2009 | Adams et al. |
| 7,644,859 B1 | 1/2010 | Zhu |
| 7,676,432 B2* | 3/2010 | Ling ................................ 705/39 |
| 7,819,307 B2 | 10/2010 | Lyons et al. |
| 7,822,688 B2 | 10/2010 | Labrou et al. |
| 8,060,449 B1 | 11/2011 | Zhu |
| 8,083,140 B1 | 12/2011 | Katzer et al. |
| 8,107,953 B2 | 1/2012 | Zimmerman et al. |
| 8,123,128 B1 | 2/2012 | Zhu |
| 2001/0013551 A1 | 8/2001 | Ramachandran |
| 2002/0052193 A1 | 5/2002 | Chetty |
| 2002/0052754 A1 | 5/2002 | Joyce et al. |
| 2002/0088852 A1 | 7/2002 | Ohta et al. |
| 2002/0128982 A1 | 9/2002 | Gefwert et al. |
| 2002/0136199 A1 | 9/2002 | Hartmaier |
| 2002/0188575 A1 | 12/2002 | Freeny, Jr. |
| 2002/0195487 A1 | 12/2002 | Hosogoe |
| 2003/0070080 A1 | 4/2003 | Rosen |
| 2003/0083933 A1 | 5/2003 | McAlear |
| 2003/0125054 A1 | 7/2003 | Garcia |
| 2003/0161503 A1 | 8/2003 | Kramer |
| 2003/0211862 A1 | 11/2003 | Hutchison, IV et al. |
| 2003/0220876 A1 | 11/2003 | Burger et al. |
| 2003/0233320 A1 | 12/2003 | Connor, Jr. |
| 2004/0044622 A1 | 3/2004 | Blott et al. |
| 2004/0122685 A1 | 6/2004 | Bunce |
| 2004/0139024 A1 | 7/2004 | So |
| 2004/0159700 A1 | 8/2004 | Khan et al. |
| 2004/0166839 A1 | 8/2004 | Okkonen et al. |
| 2004/0198333 A1 | 10/2004 | Zanaty |
| 2004/0204070 A1 | 10/2004 | August et al. |
| 2006/0073808 A1 | 4/2006 | Buchert |
| 2006/0165060 A1 | 7/2006 | Dua |
| 2006/0211408 A1 | 9/2006 | Yamagishi et al. |
| 2007/0095892 A1 | 5/2007 | Lyons et al. |
| 2007/0145152 A1 | 6/2007 | Jogand-Coulomb et al. |
| 2007/0234427 A1 | 10/2007 | Gardner et al. |
| 2007/0278291 A1* | 12/2007 | Rans et al. ..................... 235/380 |
| 2007/0281664 A1 | 12/2007 | Kaneko et al. |
| 2008/0059379 A1 | 3/2008 | Ramaci et al. |
| 2008/0067240 A1 | 3/2008 | Nakano et al. |
| 2008/0201212 A1 | 8/2008 | Hammad et al. |
| 2008/0208681 A1* | 8/2008 | Hammad et al. ................ 705/13 |
| 2009/0018964 A1 | 1/2009 | Liu et al. |
| 2009/0050689 A1 | 2/2009 | Sako et al. |
| 2009/0093272 A1* | 4/2009 | Saarisalo et al. .............. 455/558 |
| 2009/0098825 A1* | 4/2009 | Huomo et al. ................ 455/41.1 |
| 2009/0143104 A1* | 6/2009 | Loh et al. ...................... 455/558 |
| 2009/0192937 A1* | 7/2009 | Griffin et al. ................... 705/42 |
| 2010/0030651 A1 | 2/2010 | Matotek et al. |
| 2010/0094752 A1 | 4/2010 | Heath |
| 2010/0133337 A1 | 6/2010 | Van Rensburg |

OTHER PUBLICATIONS

Zhu, Kevin, Patent application entitled "Partially Delegated Over-the-Air Provisioning of a Secure Element," filed Jan. 5, 2009 as U.S. Appl. No. 12/348,371.

Persson, Sarah A.V., et al., Patent Application entitled, "Electronic Wallet Removal from Mobile Electronic Devices," filed Feb. 16, 2009, U.S. Appl. No. 12/371,901.

BlackBerry Enterprise Server for Microsoft Exchange, Version 4.0—Handheld Management Guide, Last Modified Aug. 18, 2006, Research in Motion Limited, Canada.

BlackBerry Enterprise Server for Microsoft Exchange, Version 4.0—Administration Guide, Last Modified Nov. 10, 2006, Research in Motion Limited, Canada.

Derfler, Frank J., et al., "How Networks Work," Sep. 2000, Que Corporation, A Division of MacMillan Computer Publishing, USA.

Office Action—Restriction dated Mar. 16, 2011, U.S. Appl. No. 12/348,371.

Office Action dated May 24, 2011, U.S. Appl. No. 12/348,371.

Office Action—Restriction dated Mar. 14, 2011, U.S. Appl. No. 12/371,901.

Office Action dated Apr. 14, 2011, U.S. Appl. No. 12/371,901.

Office Action dated Nov. 8, 2010, U.S. Appl. No. 12/026,224.

Office Action dated May 12, 2010, U.S. Appl. No. 12/026,224.

Final Office Action dated Apr. 28, 2011, U.S. Appl. No. 12/026,224.

Office Action dated Oct. 3, 2005, U.S. Appl. No. 10/744,169.

Office Action dated Feb. 2, 2006, U.S. Appl. No. 10/744,169.

Final Office Action dated Jun. 8, 2006, U.S. Appl. No. 10/744,169.

Notice of Allowance dated Aug. 1, 2006, U.S. Appl. No. 10/744,169.

Notice of Allowance dated Sep. 9, 2011, U.S. Appl. No. 12/348,371.

Notice of Allowance dated Sep. 6, 2011, U.S. Appl. No. 12/026,224.

Anonymous, "Sourcebook '96," Progressive Grocer Sourcebook '96 Supplement, Dec. 1995, pp. Cover-48, Maclean-Hunter Media Inc.

Zhu, Kevin, Patent Application entitled, "Partially Delegated Over-the-Air Provisioning of a Secure Element," filed Oct. 10, 2011, U.S. Appl. No. 13/270,205.

Supplemental Notice of Allowance dated Oct. 6, 2011, U.S. Appl. No. 12/348,371.

Final Office Action dated Oct. 14, 2011, U.S. Appl. No. 12/371,901.

Notice of Allowance dated Apr. 9, 2012, U.S. Appl. No. 13/270,205.

Baker, D., "Real-Time Provisioning of SIM cards: A Boon to GSM Operators", Apr. 13, 2011. http://www.billingworld.com/blogs/baker/2011/04/real-time-provisioning-of-sim-cards-a-boon-to-gsm.aspx.

Faipp Pre-Interview Communication dated Feb. 21, 2012, U.S. Appl. No. 13/270,205.

Advisory Action dated Feb. 9, 2012, U.S. Appl. No. 12/371,901.

* cited by examiner

FIG. 5
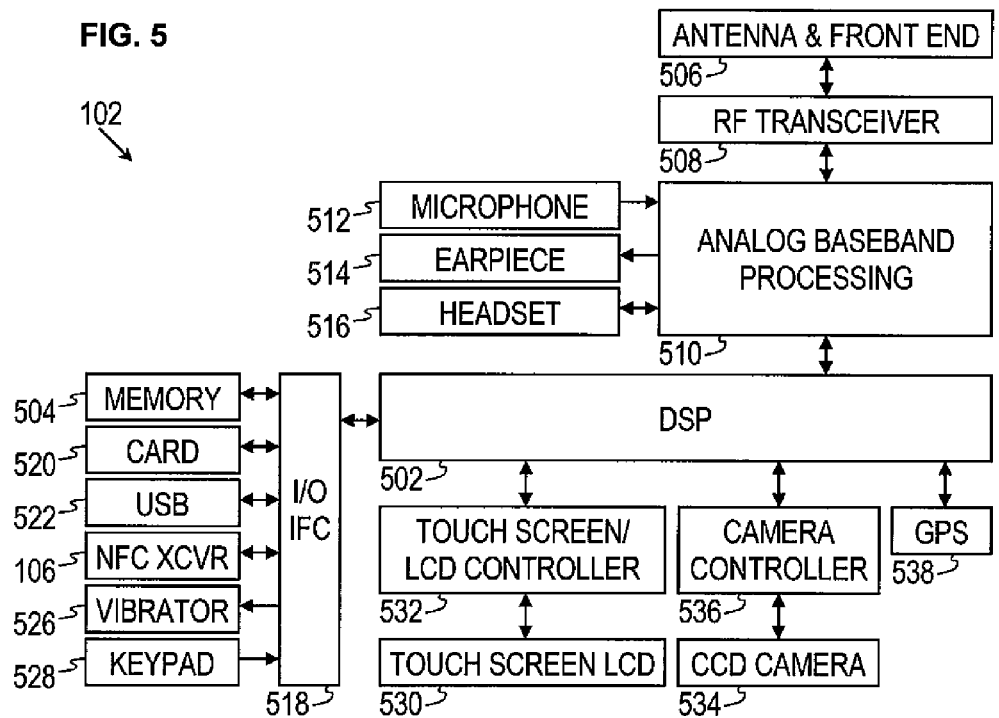
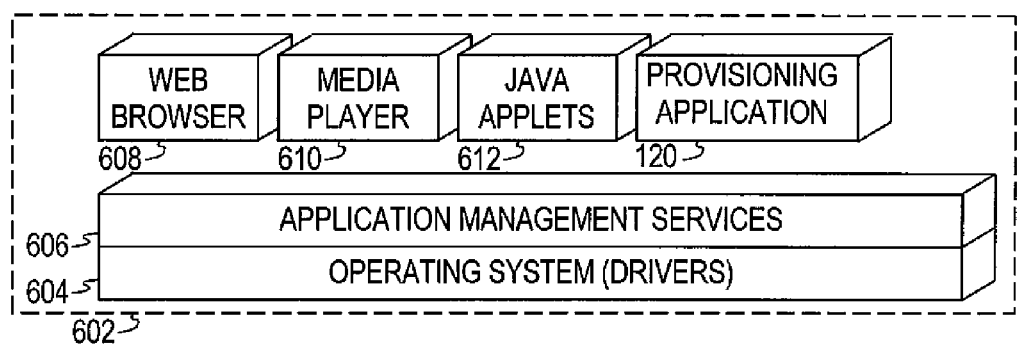
FIG. 6

SYSTEM AND METHOD OF PROVISIONING CONFIDENTIAL INFORMATION VIA A MOBILE DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Credit card payments, transit card payments, electronic badge codes, and access codes may be provided by electronic devices such as mobile phones and others. For example, a mobile phone or other electronic device having a near field communication (NFC) transceiver may communicate with a point-of-sale (POS) terminal to provide payment information to complete a sales transaction. Alternatively, a mobile phone or other electronic device may communicate with a badge reader at a building entrance to provide an individual access code to gain access to the building. Sometimes confidential information may be stored in a secure element in the mobile phone or other electronic device. The secure element may be a reserved portion of memory that cannot be accessed by unauthorized applications, whereby the confidential information is kept secure and unaltered. Alternatively, in some cases, the secure element may be a dedicated chip in the electronic device, for example a smart card chip. Sometimes funds balances may be stored in the secure element, for example transit card fund balances. The secure element may be stored in a reserved area of a random access memory (RAM) coupled to a processor and/or in a reserved area of a processor.

SUMMARY

In an embodiment, a method of provisioning a target device is provided. The method comprises a mobile device wirelessly transmitting using a public land mobile network a message to request confidential information. The confidential information is associated with at least one of a credit card, a transit card, a transit token, an electronic coupon, a loyalty program access code, an access badge, and an access code. The method also comprises the mobile device wirelessly receiving the confidential information from the public land mobile network and transmitting the confidential information using near field communication technology to the target device. The method also comprises the target device receiving the confidential information using near field communication technology and storing the confidential information.

In another embodiment, a method of provisioning a target device is provided. The method comprises a mobile device transmitting confidential information using near field communication technology to the target device. The confidential information promotes provisioning at least one of a credit card, a transit card, a transit token, an electronic coupon, a loyalty program access code, an access badge, and an access code to the target device. The method also comprises the target device receiving the confidential information using near field communication technology and the target device storing the confidential information.

In an embodiment, a mobile device is provided. The mobile device comprises a radio transceiver to receive confidential information from a wireless network and a near field communication transceiver to transmit the confidential information to a target device. The target device comprises a mobile electronic device having a short range communication transceiver and an application for conducting at least one of credit card transactions, transit fare transactions, payment transactions based on a debit card, payment transactions based on a discount card, payment transactions based on a loyalty card, payment transactions based on a coupon, and accesses to restricted access areas. The target device does not have a transceiver for communicating with the public land mobile network. The mobile device further comprises a secure element and a processor. The mobile device further comprises an application that, when executed by the processor, obtains the confidential information from the radio transceiver and stores the confidential information in the secure element and reads the confidential information from the secure element and provides the confidential information to the near field communication transceiver for transmitting to the target device, wherein the confidential information promotes provisioning at least one of a credit card, a transit card, a debit card, a discount card, a transit token, an electronic coupon, a loyalty program access code, an access badge, and an access code to the target device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 5 is a block diagram of a handset suitable for implementing aspects of an embodiment of the disclosure.

FIG. 6 is a block diagram of a software architecture of a handset suitable for implementing aspects of an embodiment of the disclosure.

DETAILED DESCRIPTION

Figure 1:
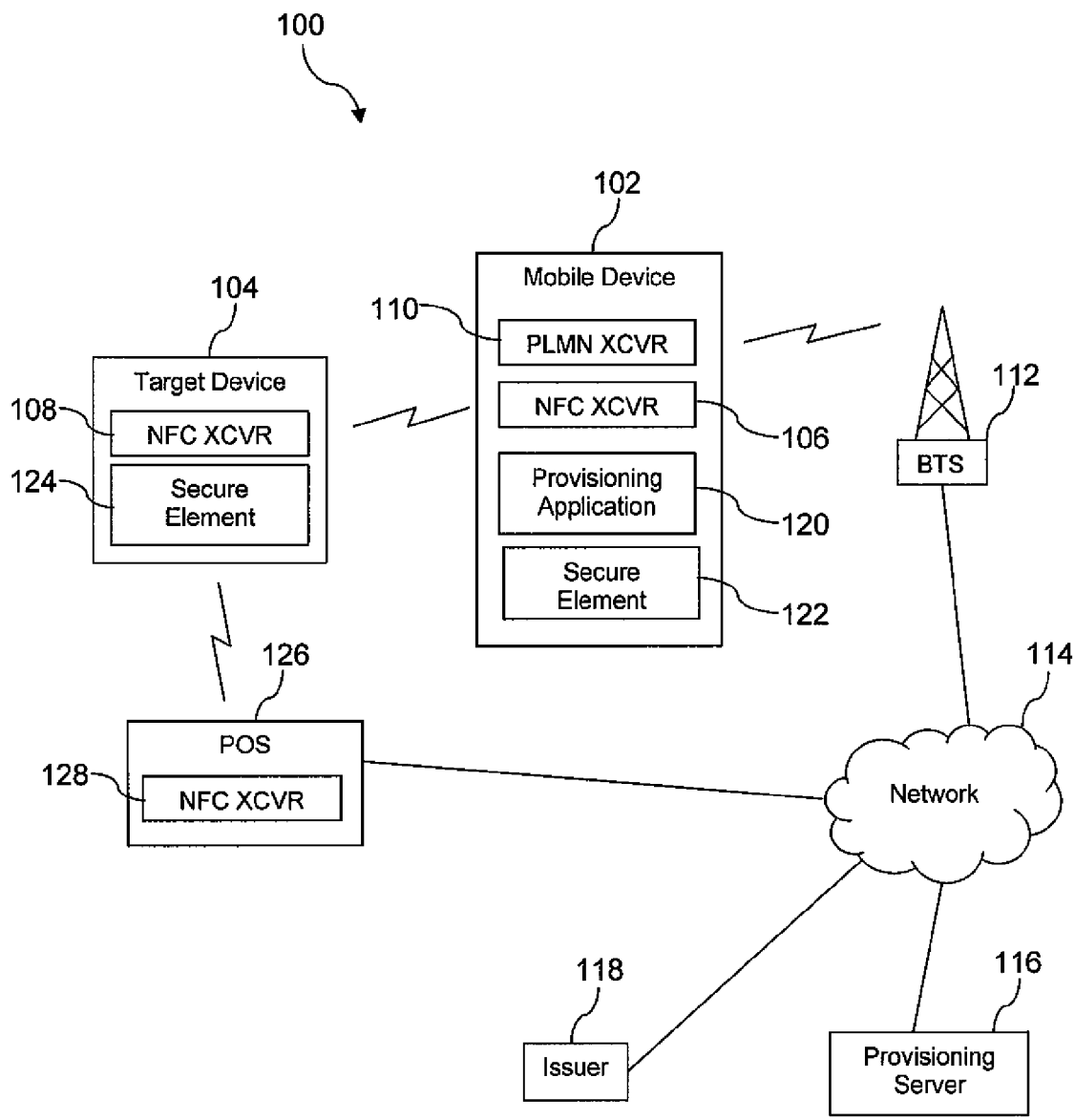
FIG. 1 is an illustration of a system for provisioning a target device according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of systems and methods of provisioning confidential information to an electronic device that does not have a radio transceiver that promotes direct connectivity to a radio access network of a public land mobile network are disclosed. The confidential information may comprise a variety of information. The confidential information may comprise provisioning information for electronic credit cards, transit cards, debit cards, loyalty cards, discount cards, coupons, access codes, and other information. The provisioning information may include computer programs and/or executable instructions that provide the functionality of an electronic credit card, a transit card, a debit card, a loyalty card, a discount card, a coupon, an access code, and other electronic functions to the electronic device. The provisioning information may include personalization information. For example, the same electronic credit card computer program may be provided to a first mobile device associated with a first user and to a second mobile device associated with a second user, but a first set of personalization information may be provided to the first mobile device to personalize the electronic credit card on the first mobile device and a second set of personalization information may be provided to the second mobile device to personalize the electronic credit card on the second mobile device. Personalization information may comprise account number information, authentication code, a shared secret, an account owner name, and other personal information.

This electronic device may be referred to as a non-networked device, a non-network enabled device, and/or a target device. The target device has a near-field-communication transceiver or other short-distance communication transceiver. In some embodiments the target device may be a mobile device, for example a watch, jewelry, and/or other fashion accessories. In some embodiments, a network enabled and/or network capable device transmits messages to the target device to provision the confidential information to the target device. In some embodiments, the network enabled device may be said to operate as a bridge for provisioning the target device. For example, the network enabled device may bridge between a provisioning server to the target device, wherein the provisioning server controls the sequencing of provisioning transactions. In another embodiment, however, the network enabled device may not operate as a bridge and may itself control sequencing of the provisioning transactions.

The confidential information may comprise a social security number; a drivers license number; credit card account information comprising at least one of a credit card account number, a credit card authentication code, a credit card expiration date, a credit card holder name, and other credit card information; transit card account information comprising at least one of a transit card account number, a transit card holder name, a transit card account balance, and other transit card information; transit token information; electronic badge information comprising at least one of a badge holder name, a supervisor name, a hire date, a department name, an access level, an employee number, an access code, and other badge information; electronic access code information comprising at least one of a name of an individual granted access, an access code, an access level, an access expiration date, and other access information; and other such confidential information. In some embodiments, the confidential information may include executable applications that promote electronic payment by the target device, for example an electronic credit card application and/or an electronic transit card application. In some scenarios, once appropriately provisioned with the confidential information, the target device may be used to make purchases or to pay for services in an exchange similar to that of paying with a credit card and/or a debit card. In some scenarios, the target device may be used to pay a fare for using a transportation vehicle. In other scenarios, the target device may be used to gain access to a secured area, for example, to enter a private building. In some scenarios, the confidential information may include spending limits, limited fund balance transfers, and/or expiration time information.

The target device may include a near field communication (NEC) transceiver. The network enabled device, for example a mobile phone, may include both a near field communication transceiver and a network transceiver. The network enabled device may request the confidential information from a provisioning server via a wireless link to a base transceiver station (BTS), via the base transceiver station to a network, and via the network to the provisioning server. The provisioning server may interwork with one or more issuers to obtain the requested confidential information. The provisioning information is returned to the network enabled device, and the network enabled device may communicate the confidential information to the target device via a near field communication wireless link. In some embodiments, the confidential information is stored in a secure element in the network enabled device, for example in a secure portion of memory or in a memory portion of a dedicated chip such as a smart card chip, before the information is transmitted via near field communication link to the target device. In an embodiment, the confidential information received by the target device is stored in a secure element of the target device.

In an embodiment, the network enabled device may not depend upon receiving the confidential information from the provisioning server and/or the issuer and may provide the confidential information to the target device without first communicating with the issuer and/or the provisioning server. For example, the network enabled device may have been authenticated and/or authorized to perform delegated provisioning by the provisioning server, for example by the provisioning server pre-loading provisioning instructions and/or data to the network enabled device in advance of provisioning the target device. The network enabled device may be constrained to complete the delegated provisioning within a limited time duration, for example within two hours, within four hours, within twenty-four hours, or within some other effective time duration. In an embodiment, a user interface of the network enabled device may be used to select a credit card, a transit card, a transit token or number of transit tokens, a rewards card, a loyalty program access code, electronic coupons, an electronic badge, and/or an electronic access code for provisioning to the target device. In an embodiment, the user interface may promote setting a time duration of the confidential information for service on the target device, for example a four hour time duration or a day time duration or some other suitable time duration. In an embodiment, the user interface may promote defining and transferring a funds limit or a number of transit tokens from a funds balance and/or a token store located on the network enabled device to the target device. In an embodiment, the user interface may promote restoring a remaining funds balance or unused transit tokens from the target device back to the network enabled device.

In an embodiment, the target device may delete the confidential information and/or mark the confidential information as inoperative when a pre-defined time duration has expired. Alternatively, in an embodiment, the back-end system, for example a point-of-sale (POS) terminal in communication with an issuer of a credit card and/or a transit card, may check to see if a time duration associated with the confidential information has expired and authorize or deny a payment transaction accordingly.

Turning now to FIG. 1, a system 100 for implementing some embodiments of the disclosure is discussed. The system 100 comprises a network enabled mobile device 102, a non-network enabled target device 104 (herein after referred to as the target device 104), a base transceiver station 112, a network 114, a provisioning server 116, an issuer 118, and a point-of-sale terminal 126. It is understood that the system 100 may comprise any number of network enabled mobile devices 102, target devices 104, base transceiver stations 112, provisioning servers 116, issuers 118, and point-of-sale terminals 126.

The network enabled device 102 may be any of a mobile phone, a personal digital assistant (PDA), a media player, and other network enabled mobile electronic device. A network enabled mobile device suitable to implementing some aspects of the disclosure is discussed in detail hereinafter. The network enabled mobile device 102 comprises a public land mobile network (PLMN) transceiver 110, a first near field communication transceiver 106, a provisioning application 120, and an optional first secure element 122. The public land mobile network transceiver 110 promotes wireless communication with the radio access network (RAN) of the public land mobile network (PLMN), also known as a wireless network. The public land mobile network transceiver 110 may promote wireless communications according to one or more of code division multiple access (CDMA), global system for mobile telecommunications (GSM), worldwide interoperability for microwave access (WiMAX), and other wireless communications technologies. The first near field communication transceiver 106 promotes communication using near field communication techniques. The provisioning application 120 is a computer program that provides functionality for provisioning confidential information to the target device 104. In some embodiments, the network enabled device 102 comprises the first secure element (SE) 122. A secure element may be a secure memory area that is suitable for providing secure financial and/or payment transactions. Alternatively, a secure element may be a dedicated integrated circuit chip, for example a smart card chip, that may include both a processor and a memory.

The target device 104 may be an electronic device that has a lesser communication capability than the network enabled mobile device 102. The target device 104 may be a simple electronic communication device embedded in some other article, for example in a wrist watch, in a ring, or in another article or apparel accessory. The target device 104 may be, for example, a radio frequency identification (RFID) tag attached to an article. The target device 104 may be embedded in a card and may have a form suitable for storing and/or carrying in a wallet or purse. The target device 104 comprises a second near field transceiver 108 and an optional second secure element 124. In an embodiment where the target device 104 is a radio frequency identification tag, for example, the target device 104 may comprise memory but no second secure element 124. The near field communication transceiver 108 promotes communication with the network enabled mobile device 102 and the point-of-sale terminal 126.

The base transceiver station 112 is part of the radio access network and is connected to the network 114 by at least one of a wired and a wireless link. The network enabled mobile device 102 may establish a wireless link to the base transceiver station 112 to gain communications access to the network 114. The network 114 may be any combination of wired and wireless networks and public and private networks.

The provisioning server 116 is a general purpose computer that may provide provisioning support to the network enabled mobile device 102 in some embodiments. General purpose computer systems are described hereinafter. The network enabled mobile device 102 may communicate with the provisioning server 116 via the network 114. The issuer 118 may be a general purpose computer operated by a financial institution such as a credit card issuer, a debit card issuer, or other card issuer. The issuer 118 may be associated with or delegated authority by a plurality of retailers to distribute electronic coupons, loyalty program access codes, and other confidential information. The issuer 118 may be a general purpose computer operated by a transit provider that issues transit cards and/or electronic transit accounts for access to a transportation system. The issuer 118 may be a general purpose computer operated by a physical security office of a building or campus. The network enabled mobile device 102 may communicate with the issuer 118 via the network 114 and/or via the provisioning server 116.

The point-of-sale terminal 126 may be a general purpose computer system having a third near field communication transceiver 128. The point-of-sale terminal 126 may be a check-out station at a grocery store, department store, or other retail outlet. The point-of-sale terminal 126 may be a mobile payment device for receiving payment, for example in a restaurant or other business. The point-of-sale terminal 126 may communicate with other entities, for example with the issuer 118, via the network 114.

In an embodiment, the network enabled mobile device 102 transmits confidential information, for example credit card information and/or debit card information, to the target device 104 via a near field communication link between the first near field communication transceiver 106 and the second near field communication transceiver 108, which may be referred to in some contexts as provisioning the target device 104. The target device 104, after being provisioned with the appropriate confidential information, may communicate with the point-of-sale terminal 126 via a near field communication link to complete a purchase or other payment transaction. The confidential information may be any of information associated with a credit card, a debit card, a transit card, a transit token, an electronic badge, a toll tag, an access code, an electronic coupon, a loyalty program access code, and other confidential information. When provisioned with the confidential information, the target device 104 may be employed to make electronic payments and/or access secured areas based on the confidential information. The confidential information may comprise a variety of information. The confidential information may comprise provisioning information for electronic credit cards, transit cards, debit cards, loyalty cards, discount cards, coupons, access codes, and other information. The provisioning information may include computer programs and/or executable instructions that provide the functionality of an electronic credit card, a transit card, a debit card, a loyalty card, a discount card, a coupon, an access code, and other electronic functions to the electronic device. The provisioning information may include personalization information. For example, the same electronic credit card computer program may be provided to a first mobile device associated with a first user and to a second mobile device associated with a second user, but a first set of personalization information may be provided to the first mobile device to personalize the electronic credit card on the first mobile device and a second set of personalization information may be provided to the second mobile device to personalize the electronic credit card on the second mobile device. Personalization information may comprise account number information, authentication code, a shared secret, an account owner name, and other personal information.

In an embodiment, a user of the network enabled mobile device 102 may select inputs to cause the provisioning application 120 to conduct a provisioning session to provision confidential information to the target device 104. In an embodiment, the provisioning session may begin with the network enabled mobile device 102 exchanging messages with the target device 104 via a near field communication link between the first near field communication transceiver 106 and the second near field communication transceiver 108 to authenticate the target device 104. The authentication may involve the network enabled mobile device 102 issuing a challenge to the target device 104 and the target device 104 responding to the challenge with an authentication code. This challenge-response exchange may be conducted using public key encryption techniques and/or other encryption techniques.

In some embodiments, however, a different authentication technique may be used. In an embodiment, provisioning of a first confidential information may involve coordination with the issuer 118. For example, the provisioning application 120 may send a request for the first confidential information via the public land mobile network transceiver 110 to the base transceiver station 112 via the network to the provisioning server 116. The provisioning server 116 may conduct a message session with the issuer 118 to obtain the requested first confidential information. The provisioning server 116 returns the first confidential information to the provisioning application 120 via the network 114 and via the base transceiver station 112.

In an embodiment, the network enabled mobile device 102 may store the first confidential information in the first secure element 122 before transmitting the first confidential information to the target device 104 via a near field communication link between the first near field transceiver 106 and the second near field transceiver 108. In some cases, the first confidential information may be requested and stored in the secure element 122 and at some later time, possibly after a significant delay, may be transmitted to the target device 104. In another embodiment, however, the network enabled mobile device 102 does not store the confidential information but instead immediately transmits it to the target device 104.

In another embodiment, the provisioning session is conducted without involvement of either the provisioning server 116 or the issuer 118. In this case, the provisioning server 116 may have pre-loaded the confidential information to the network enabled mobile device 102, for example to the secure element 122, and the network enabled mobile device 102 may transmit the confidential information at a later time to the target device 104. The network enabled mobile device 102 may have requested pre-loading of the confidential information, and the provisioning server 116 may have performed appropriate authentication and/or authorization before transmitting the confidential information to the network enabled mobile device 102. In an embodiment, the pre-loaded confidential information may be associated with an expiration date and/or time, for example a date and/or time beyond which the pre-loaded confidential information may not be allowed to be transmitted to the target device 104. For example, the network enabled mobile device 102 may be constrained to employ the pre-loaded confidential information within about two hours, within about four hours, within about twenty-four hours, or within some other effective time duration.

The confidential information, in some scenarios, may define a time duration during which the confidential information may be used by the target device 104. Additionally, the confidential information may define a maximum payment limit or a limited number of transit tokens. For example, a teenager may be granted use of a credit card for a predefined, limited time duration and for a defined, limited aggregate expense. In a first embodiment, the target device 104 may mark the confidential information inoperative after the expiration of the defined time duration, however in another embodiment, the enforcement of the defined time duration may be performed in the back-end system, for example by the point-of-sale terminal 126 messaging to the provisioning server 116 and/or the issuer 118. When using back-end system enforcement, when a payment or access is attempted after the expiration of the defined time duration, the back-end—for example the provisioning server 116 or the issuer 118—rejects the payment or access attempt. When back-end system enforcement of the defined time duration is employed, the provisioning process includes the user defining the time duration to the provisioning application 120, and the provisioning application 120 including the defined time duration in the provisioning request described above.

In an embodiment, the provisioning application 120 may support commanding the target device 104 to transfer a remaining funds balance or remaining unused transit tokens back to the network enabled mobile device 102 via a near field communication link between the first near field communication transceiver 106 and the second near field communication transceiver 108. In some embodiments, the system 100 promotes a user leaving a bulky and/or expensive electronic device—the network enabled mobile device 102—at home and traveling light by using instead the target device 104 provisioned with needed payment funds and/or transit tokens. For example, the user may go out for a night of entertainment wearing only a stylish watch that embeds the target device 104. The system 100 promotes transferring and recovering funds, credit card information, and access codes freely among different fashion accessories or jewelry from day to day.

Figure 2:
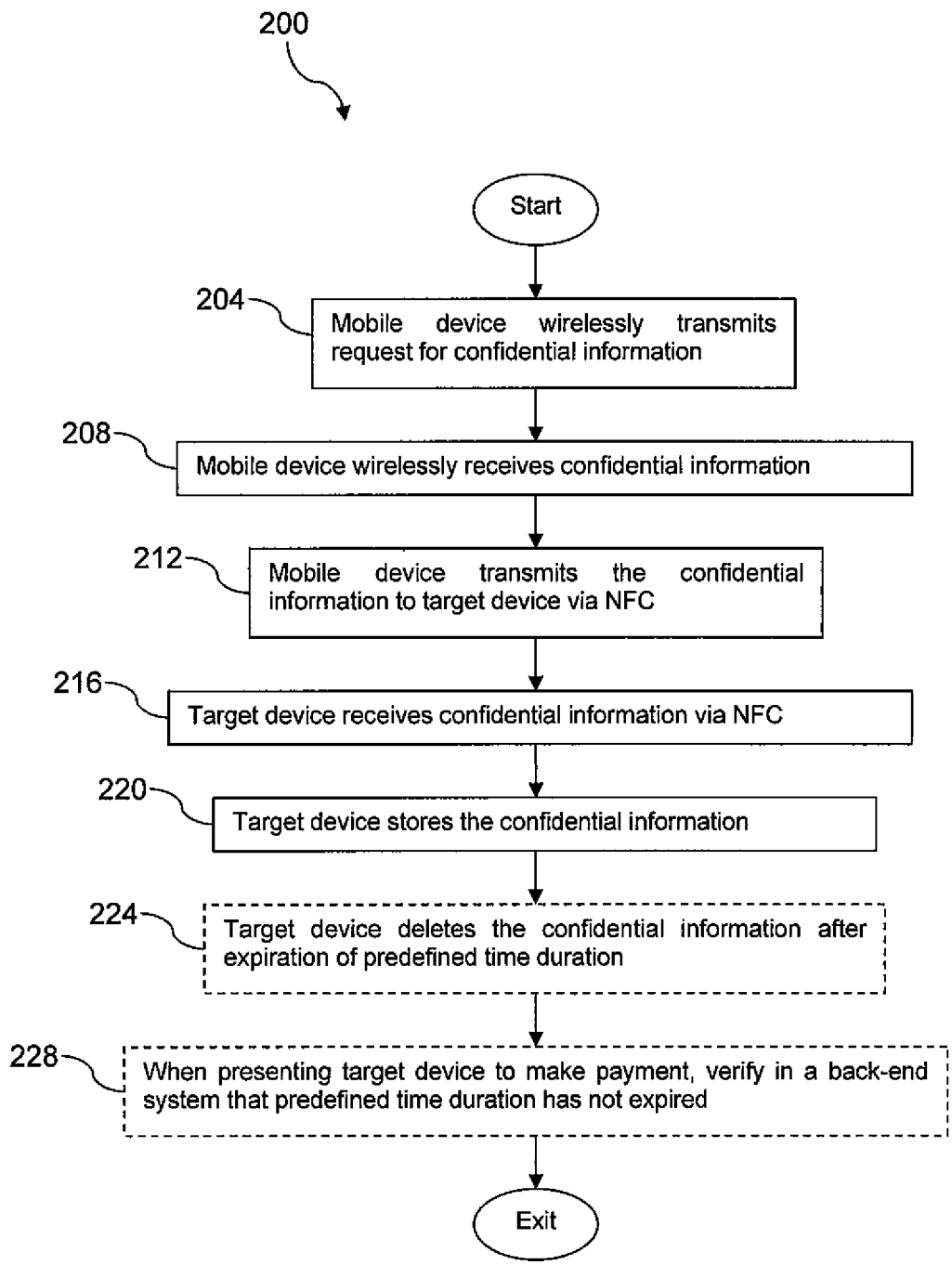
FIG. 2 is a flow chart of a method of provisioning a target device according to an embodiment of the disclosure.

Turning now to FIG. 2, a method 200 is described. At block 204, a first mobile device, for example the network enabled mobile device 102, transmits a request for confidential information. The request identifies the confidential information requested and also may identify a predefined time duration for which the confidential information is to be valid, funds balance information, and payment limits. At block 208, the first mobile device receives the confidential information. The confidential information may comprise one or more of credit card information, debit card information, coupon information, transit card information, transit token information, electronic badge information, electronic access code information, electronic coupon information, loyalty program access information, and other information.

At block 212, the first mobile device transmits the confidential information to a second mobile device, hereinafter the target device 104, via near field communications. In block 216, the target device 104 receives the confidential information via near field communications. In block 220, the target device 104 stores the confidential information, for example in the second secure element 124. The target device 104 may use the confidential information, for example to make electronic payments and/or access secure areas.

At block 224, the target device 104 optionally deletes the confidential information after expiration of the predefined time duration. At block 228, the target device 104 makes a payment using near field communication, for example with a point-of-sale terminal 126, and the back-end system, for example the point-of-sale terminal 126 communicating with the provisioning server 116 or with the issuer 118, optionally verifies that the predefined time duration of the confidential information has not expired.

Figure 3:
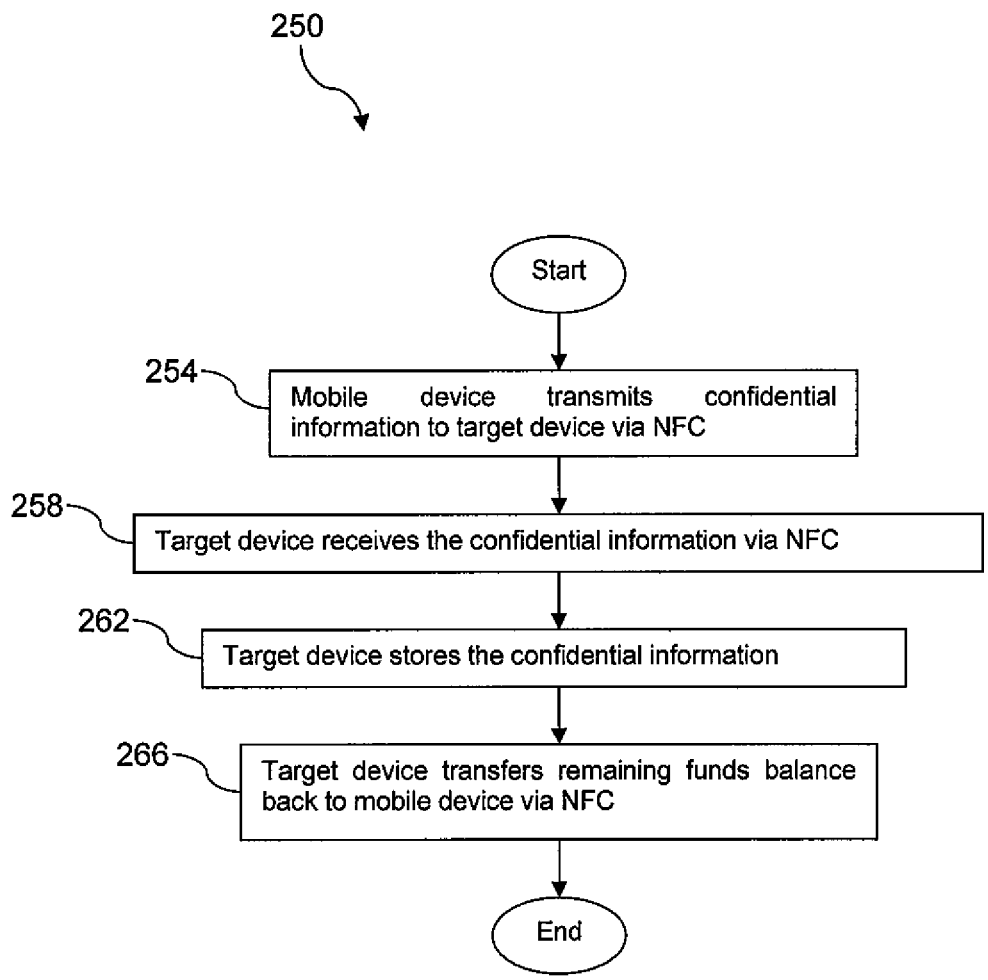
FIG. 3 is a flow chart of another method of provisioning a target device according to an embodiment of the disclosure.

Turning now to FIG. 3, a method 250 is discussed. At block 254, a first mobile device, for example the network enabled mobile device 102, transmits confidential information to a second mobile device, herein after the target device 104, via near field communications. The confidential information may comprise funds balance information, for example a transit card funds balance, and/or a plurality of transit tokens. At block 258, the target device 104 receives the confidential information via near field communications. At block 262, the target device 104 stores the confidential information, for example in the secure element 124 or in another portion of memory, for example in a portion of a random access memory (not shown) of the target device 104. In block 266, the target device 104 transfers a remaining funds balance and/or remaining transit tokens back to the first mobile device via near field communications.

Figure 4:
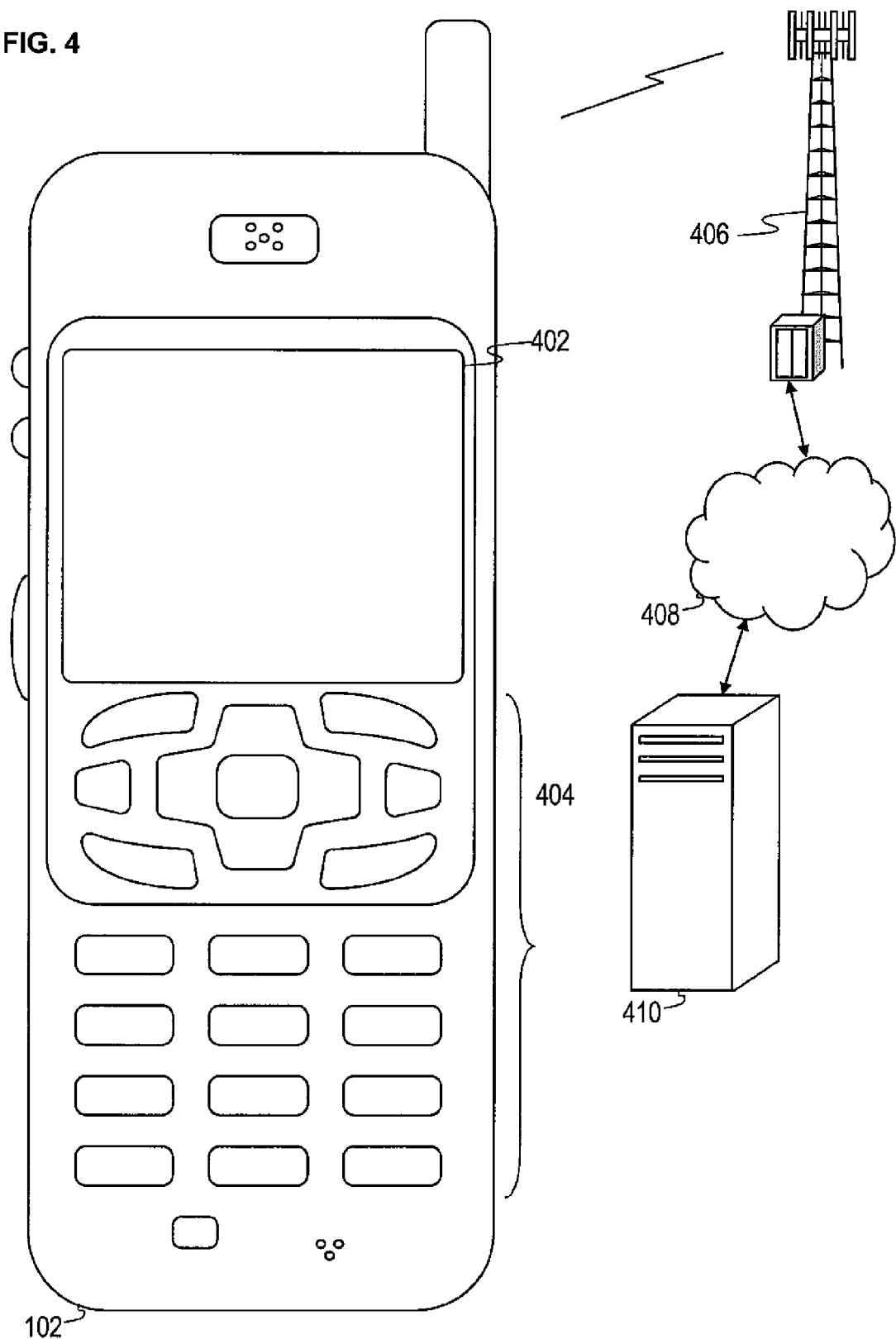
FIG. 4 is an illustration of a handset suitable for implementing aspects of an embodiment of the disclosure.

FIG. 4 shows a wireless communications system including the network enabled mobile device 102. Though illustrated as a mobile phone, the network enabled mobile device 102 may take various forms including a wireless handset, a pager, a personal digital assistant (PDA), a gaming device, an inventory control device, a job control device, a media player, a digital camera, a digital calculator, and/or other. Many suitable handsets combine some or all of these functions.

The network enabled mobile device 102 includes a display 402 and a touch-sensitive surface or keys 404 for input by a user. The network enabled mobile device 102 may present options for the user to select, controls for the user to actuate, and/or cursors or other indicators for the user to direct. The network enabled mobile device 102 may further accept data entry from the user, including numbers to dial or various parameter values for configuring the operation of the handset. The network enabled mobile device 102 may further execute one or more software or firmware applications in response to user commands. These applications may configure the network enabled mobile device 102 to perform various customized functions in response to user interaction. Additionally, the network enabled mobile device 102 may be programmed and/or configured over-the-air, for example from a wireless base station, a wireless access point, or a peer mobile device 102.

The network enabled mobile device 102 may execute a web browser application which enables the display 402 to show a web page. The web page may be obtained via wireless communications with a base transceiver station (BTS) 406, a wireless network access node, a peer mobile device 102 or any other wireless communication network or system. While a single base transceiver station 406 is illustrated, it is understood that the wireless communication system may comprise additional base transceiver stations. In some instances, the network enabled mobile device 102 may be in communication with multiple base transceiver stations 406 at the same time. The base transceiver station 406 (or wireless network access node) is coupled to a wired network 408, such as the Internet. Via the wireless link and the wired network, the network enabled mobile device 102 has access to information on various servers, such as a server 410. The server 410 may provide content that may be shown on the display 402. Alternately, the network enabled mobile device 102 may access the base transceiver station 406 through a peer mobile device 102 acting as an intermediary, in a relay type or hop type of connection.

FIG. 5 shows a block diagram of the network enabled mobile device 102. While a variety of known components of handsets are depicted, in an embodiment a subset of the listed components and/or additional components not listed may be included in the network enabled mobile device 102. Additionally, in some embodiments, the target device 104 may be embodied by a subset of the listed components associated with FIG. 5. The network enabled mobile device 102 includes a digital signal processor (DSP) 502 and a memory 504. The first secure element 122 may be provided as a protected or limited access portion of the memory 504. As shown, the network enabled mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, the near field communication transceiver 106, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the network enabled mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the network enabled mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the network enabled mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the network enabled mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the near field communication transceiver 106. The USB port 522 may enable the network enabled mobile device 102 to function as a peripheral device to exchange information with a personal computer or other computer system. Optional ports (not shown) such as a Bluetooth interface or an IEEE 802.11 compliant wireless interface may enable the network enabled mobile device 102 to communicate wirelessly with other nearby handsets and/or wireless base stations.

The input/output interface 518 may further connect the DSP 502 to the vibrator 526 that, when triggered, causes the network enabled mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the network enabled mobile device 102. Another input mechanism may be the touch screen LCD 530, which may also display text and/or graphics to the user. The touch screen LCD controller 532 couples the DSP 502 to the touch screen LCD 530.

The CCD camera 534 enables the network enabled mobile device 102 to take digital pictures. The DSP 502 communicates with the CCD camera 534 via the camera controller 536. The GPS sensor 538 is coupled to the DSP 502 to decode global positioning system signals, thereby enabling the network enabled mobile device 102 to determine its position. In another embodiment, a camera operating according to a technology other than charge coupled device cameras may be employed. Various other peripherals may also be included to provide additional functions, e.g., radio and television reception.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the network enabled mobile device 102. Also shown in FIG. 6 are a web browser application 608, a media player application 610, JAVA applets 612, and the provisioning application 120. The web browser application 608 configures the network enabled mobile device 102 to operate as a web browser, allowing a user to enter information into forms and select links to retrieve and view web pages. The media player application 610 configures the network enabled mobile device 102 to retrieve and play audio or audiovisual media. The JAVA applets 612 configure the network enabled mobile device 102 to provide games, utilities, and other functionality.

Figure 7:
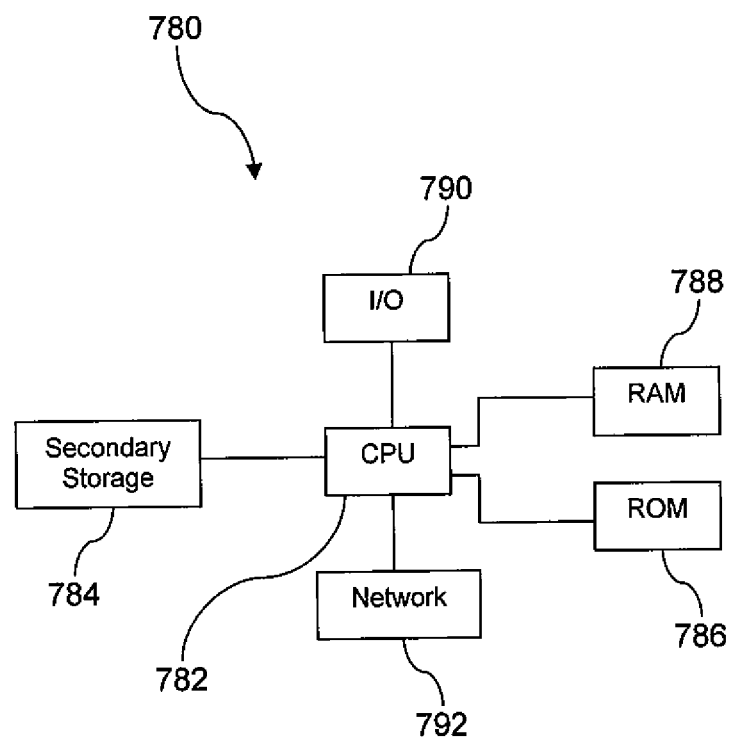
FIG. 7 illustrates an exemplary general purpose computer system suitable for implementing the several embodiments of the disclosure.

Some aspects of the system described above may be implemented on any general purpose computer with sufficient processing power, memory resources, and network throughput capability to handle the necessary workload placed upon it, for example the provisioning server 116 and the issuer 118. In some embodiments, the target device 104 may share some aspects with a general purpose computer. FIG. 7 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 792 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for conducting a transaction between a near field communication (NFC) terminal and a target device, said method includes a provisioning of confidential information from a mobile device to the target device, said method comprising:
    wirelessly transmitting, by a mobile device having a cellular transceiver, an NFC transceiver, a memory element, an operating system, applications, and a display, a request for confidential information over a cellular network to a server, wherein the confidential information is associated with provisioning at least one of a credit card, a transit card, a transit token, an electronic coupon, a loyalty program access code, an access badge, and an access code;
    wirelessly receiving over the cellular network, by the mobile device, the confidential information from the server;
    provisioning, by the mobile device using NFC technology, the confidential information to a target device having an NFC transceiver and a memory element for storing the confidential information;
    presenting the target device to make payment for one of a purchase and a service;
    transmitting, by the target device, the confidential information to an NFC terminal to conduct a transaction using NFC technology, wherein the mobile device, the target device, and the NFC terminal are three separate devices and function independently of each other;
    verifying, by the NFC terminal through a back-end system to the server, the confidential information;
    when the confidential information is verified, completing, by the target device independent of the mobile device, the payment transaction with the NFC terminal using NFC technology; and
    when the confidential information is not verified, refusing the payment transaction.

2. The method of claim 1, further including storing the confidential information in a first secure element of the mobile device before provisioning the target device with the confidential information.

3. The method of claim 1, further including storing the confidential information in a second secure element of the target device.

4. The method of claim 1, further including:
    verifying in the back-end system that a user defined time duration associated with the confidential information has not expired;
    when the user defined time duration associated with the confidential information has not expired and when the payment does not exceed a predefined limit, completing the payment transaction; and
    when the user defined time duration associated with the confidential information has expired, refusing the payment transaction.

5. The method of claim 1, further including the target device deleting the confidential information based on a determination that a time duration associated with the confidential information has expired.

6. The method of claim 1, further including the target device marking the confidential information as inoperative after a time duration associated with the confidential information has expired.

7. The method of claim 1, further including the mobile device challenging the target device to authenticate the target device.

8. The method of claim 1, wherein the confidential information is received from an issuer of one of the credit card, the transit card, the transit token, the access badge, and the access code.

9. The method of claim 1, wherein the confidential information comprises at least one of account information, fund balance information, remaining credit limit information, electronic identification code information, and an application executable, and wherein the application executable promotes using the target device to perform at least one of making payments and accessing a secure area.

10. The method of claim 1, wherein the predefined limit is an aggregate expense limit associated with the confidential information and further comprising:
when the aggregate expense limit is exceeded, refusing the payment transaction.

11. A method for conducting a transaction between a near field communication (NFC) terminal and a target device, said method comprising:
transmitting, by a mobile device having a cellular transceiver, an NFC transceiver, a memory element, an operating system, applications, and a display, preloaded confidential information to a target device, wherein the preloaded confidential information promotes provisioning at least one of a credit card, a transit card, a transit token, an electronic coupon, a loyalty program access code, an access badge, and an access code to the target device;
provisioning, by the mobile device using NFC technology, the preloaded confidential information to the target device;
presenting the target device to make payment for one of a purchase and a service;
transmitting, by the target device, the preloaded confidential information to an NFC terminal to conduct a transaction using NFC technology, wherein the mobile device, the target device, and the NFC terminal are three separate devices and function independent of each other;
verifying, by the NFC terminal through a back-end system, the preloaded confidential information;
when the preloaded confidential information is verified, completing, by the target device independent of the mobile device, the payment transaction with the NFC terminal using NFC technology; and
when the preloaded confidential information is not verified, refusing the payment transaction.

12. The method of claim 11, wherein the preloaded confidential information transmitted by the mobile device to the target device comprises a first funds transfer from the mobile device to the target device.

13. The method of claim 12, further including transferring a remaining funds balance from the target device back to the mobile device.

14. The method of claim 11, wherein the preloaded confidential information comprises a time duration of the preloaded confidential information.

15. The method of claim 14, further including the target device deleting the preloaded confidential information based on a determination that the time duration expires.

16. The method of claim 11, wherein the target device is one of a wrist watch, a radio frequency identification tag, a media player, or a digital camera.

17. The method of claim 11, wherein the mobile device is one of a mobile phone or a personal digital assistant.

18. A mobile device, comprising:
a radio transceiver of the mobile device to receive confidential information and an expiration time of the confidential information from a server over a wireless network, wherein the expiration time defines a time duration during which the confidential information may be used by a target device;
an NFC transceiver of the mobile device to transmit the confidential information and the expiration time of the confidential information to the target device, wherein the target device comprises a short range communication transceiver and an application for conducting at least one of credit card transactions, transit fare transactions, payment transactions based on a debit card, payment transactions based on a discount card, payment transactions based on a loyalty card, payment transactions based on a coupon, and accesses to restricted access areas;
a secure element of the mobile device;
a processor of the mobile device; and
an application of the mobile device that, when executed by the processor, obtains the confidential information and the expiration time of the confidential information via the radio transceiver, stores the confidential information and the expiration time of the confidential information in the secure element, transmits the confidential information and the expiration time of the confidential information to the target device, wherein the confidential information promotes provisioning at least one of a credit card, a transit card, a debit card, a discount card, a transit token, an electronic coupon, a loyalty program access code, an access badge, and an access code to the target device, wherein the target device functions independently of the mobile device and uses the confidential information to conduct a NFC terminal, wherein when the target device is presented to make payment for one of a purchase and a service, the NFC terminal verifies the confidential information through a back-end system to the server, wherein when the confidential information is verified, the target device completes the payment transaction with the NFC terminal independent of the mobile device using NFC technology, and wherein when the confidential information is not verified, the payment transaction is refused.

19. The mobile device of claim 18, wherein the radio transceiver communicates with the wireless network using at least one of a code division multiple access (CDMA) technology, a global system for mobile communications (GSM) technology, and a worldwide interoperability microwave access (WiMAX) technology.

20. The mobile device of claim 18, wherein the application further challenges the target device to authenticate the target device before transmitting the confidential information to the target device.

* * * * *